United States Patent
Teshima et al.

(10) Patent No.: US 7,625,066 B2
(45) Date of Patent: Dec. 1, 2009

(54) MIXING APPARATUS, DISPERSION MANUFACTURING APPARATUS AND DISPERSION MANUFACTURING METHOD

(75) Inventors: Takayuki Teshima, Yokohama (JP); Kazumichi Nakahama, Tokyo (JP); Yukio Hanyu, Isehara (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 11/855,466

(22) Filed: Sep. 14, 2007

(65) Prior Publication Data
US 2008/0309708 A1 Dec. 18, 2008

(30) Foreign Application Priority Data
Oct. 11, 2006 (JP) .............................. 2006-278111

(51) Int. Cl.
*B41J 2/155* (2006.01)
(52) U.S. Cl. .......................................... 347/43; 347/40
(58) Field of Classification Search .................... 347/12, 347/40, 43, 15
See application file for complete search history.

(56) References Cited

U.S. PATENT DOCUMENTS

| | | | |
|---|---|---|---|
| 5,085,698 A | 2/1992 | Ma et al. | |
| 7,125,098 B2* | 10/2006 | Silverbrook et al. | 347/43 |
| 7,188,930 B2* | 3/2007 | Silverbrook et al. | 347/43 |

FOREIGN PATENT DOCUMENTS

| | | |
|---|---|---|
| JP | 2002-155221 | 5/2002 |
| JP | 2002-336667 | 11/2002 |

* cited by examiner

*Primary Examiner*—Lamson D Nguyen
(74) *Attorney, Agent, or Firm*—Canon U.S.A., Inc., IP Division (57) ABSTRACT

A mixing apparatus including a plurality of nozzle groups each formed of nozzles for ejecting the same fluid arranged in group, the nozzles being provided with openings for ejecting fluid, to cause the plurality of nozzle groups to separately eject a plurality of fluids to mix the fluids in areas on the extending lines of the nozzles, wherein the openings of the nozzles forming the nozzle groups are arranged along annular loci and the plurality of nozzle groups are arranged coaxially to each other, a plurality of supplying channels for supplying the plurality of fluids to the nozzle groups corresponding to the plurality of nozzle groups are annular in cross section in the direction perpendicular to the direction in which fluid supplied to the supplying channels flows and arranged coaxially to each other.

11 Claims, 7 Drawing Sheets

MIXING APPARATUS, DISPERSION MANUFACTURING APPARATUS AND DISPERSION MANUFACTURING METHOD

BACKGROUND OF THE INVENTION

1. Field of the Invention

The present invention relates to a mixing apparatus for manufacturing materials and products by mixture and reaction of fluids, a dispersion manufacturing apparatus and a dispersion manufacturing method in the chemical and pharmaceutical industries.

2. Description of the Related Art

As an aqueous dispersion material containing functional material, there have been hitherto known functional materials composed of agricultural chemicals such as herbicide and insecticide, medicine such as anticancer drug, antiallergic agent and antiphlogistine, and colorant such as ink with colorant and toner. A digital printing technique has made significant progress in recent years. A typical digital printing technique is electrophotography and ink jet technique and has enhanced its presence as an image forming technique in office and home in late years.

In the digital printing technique, the ink jet technique as a direct recording method features compactness and low consumption power. The ink jet technique has been increasingly directed toward higher image quality according to the miniaturization of a nozzle.

There has been known a method as one example of the ink jet technique in which ink supplied from an ink tank is heated by a heater in a nozzle to perform evaporation foam, ejecting ink to form images on recording medium. As another example a method has been known in which a piezoelectric element is vibrated to eject ink from a nozzle.

The ink used in the methods sometimes causes blur at the time of superposing colors because aqueous solution of dye is typically used and phenomenon referred to as feathering in the direction of fibers at a recording place on the recording medium. U.S. Pat. No. 5,085,698 discloses that pigment dispersion ink is used to improve the above problems. However, the pigment dispersion ink is probably inferior to dye ink. For example, light scattering and light reflection are caused by pigment particles, so that images formed by the pigment ink generally tends to be lower in coloring than those by dye ink. Coarse pigment particles cause clogging of the nozzle of an ink jet head. An attempt has been made to fine pigment particles as one of the methods of improving the problems with the pigment ink. The pigment made finer in size to 100 nm or less is less affected by light scattering and increases in specific surface area, so that improvement in coloring is expected.

There has been known a method of dispersing pigments using a microjet reactor to obtain excellent pigment dispersions. For example, Japanese Patent Application Laid-Open No. 2002-155221 discloses a method as a method of producing pigment dispersion ink in which solution in which coarse pigment is dissolved into solvent and a precipitant medium are sprayed from a nozzle to collide with each other in a reactor chamber surrounded by a housing, obtaining pigment suspension. Solution ejected from the nozzle may cause pigments formed by precipitation in the reactor chamber to stick to the inner wall of the chamber to cause precipitation and deposition on the inner wall of the chamber or peeling of the deposition, so that it is not always easy to stably obtain pigment suspension for a long time.

Japanese Patent Application Laid-Open No. 2002-336667 discloses a method of mixing two different liquids at a high speed to form solid deposit. In this method, two different liquids are supplied to an orifice and then caused to pass through a divergent shielding portion at a high speed to produce the solid deposit in a jet collision mixing room. The use of such a micro mixer enables producing minute particles with a narrower particle-size distribution as compared with the case where a conventional batch method using a large capacity tank is used as a place of mixing and reaction.

However, a mixing efficiency needs to be further improved to reduce and uniform particle diameter, for this reason, a nozzle diameter requires to be reduced to decrease the absolute amount of liquid. Furthermore, a plurality of micro mixers mentioned above needs to be arranged to improve productivity. This requires wider space for the micro mixers.

The present invention has been made in view of the problems in the above related art and has for its purpose to provide a fluid mixing apparatus and a dispersion manufacturing apparatus which are small in dispersion of products, stable in production and adapted to space saving and mass production of products.

SUMMARY OF THE INVENTION

A mixing apparatus according to the present invention includes a plurality of nozzle groups each formed of nozzles for ejecting the same fluid arranged in group, the nozzles being provided with openings for ejecting fluid, to cause the plurality of nozzle groups to separately eject a plurality of fluids to mix the fluids in areas on the extending lines of the nozzles, wherein the openings of the nozzles forming the nozzle groups are arranged along annular loci and the plurality of nozzle groups are arranged coaxially to each other, a plurality of supplying channels for supplying the plurality of fluids to the nozzle groups corresponding to the plurality of nozzle groups are annular in cross section in the direction perpendicular to the direction in which fluid supplied to the supplying channels flows and arranged coaxially to each other.

A dispersion manufacturing apparatus provided by the present invention includes a plurality of nozzle groups each formed of nozzles for ejecting the same fluid arranged in group, the nozzles being provided with openings for ejecting fluid, to cause the plurality of nozzle groups to separately eject a plurality of fluids to react the fluids in areas on the extending lines of the nozzles to produce reaction products to disperse the reaction products in a dispersion medium, wherein the openings of the nozzles forming the nozzle groups are arranged along annular loci and the plurality of nozzle groups are arranged coaxially to each other, a plurality of supplying channels for supplying the plurality of fluids to the nozzle groups corresponding to the plurality of nozzle groups are annular in cross section in the direction perpendicular to the direction in which fluid supplied to the supplying channels flows and arranged coaxially to each other.

A method of manufacturing dispersion provided by the present invention includes reacting at least two different kinds of fluids to produce reaction products and dispersing particles formed of the reaction products in dispersion medium, the method including: preparing a mixing apparatus including a plurality of nozzle groups each formed of nozzles for ejecting the same fluid arranged in group, the nozzles being provided with openings for ejecting fluid, to cause the plurality of nozzle groups to separately eject a plurality of fluids to mix the fluids in areas on the extending lines of the nozzles, wherein the openings of the nozzles forming the nozzle groups are arranged along annular loci and the plurality of nozzle groups are arranged coaxially to each other, a plurality of supplying channels for supplying the plurality of fluids to the nozzle groups corresponding to the plurality of nozzle groups are annular in cross section in the direction perpendicular to the direction in which fluid supplied to the supplying channels flows and arranged coaxially to each other; and ejecting at least two different kinds of fluids supplied from the plurality of supplying channels from the nozzle groups.

According to the mixing apparatus of the present invention, arranging a plurality of nozzles (nozzle openings) ejecting the same fluid to a supplying channel for supplying fluid at an equivalent position allows variation in ejection of fluid to be made small. This enables variation in mixing and chemical reaction between the fluid to be made small and the mixing and chemical reaction to be made efficient. Small variation in ejection leads to a beneficial effect on a stable production of products.

According to a dispersion manufacturing apparatus of the present invention, there may be provided an apparatus capable of stably manufacturing dispersions small and uniform in particle diameter.

Further features of the present invention will become apparent from the following description of exemplary embodiments with reference to the attached drawings.

DESCRIPTION OF THE EMBODIMENTS

A typical example of the present invention is described below with reference to the drawings.

Figure 1A:
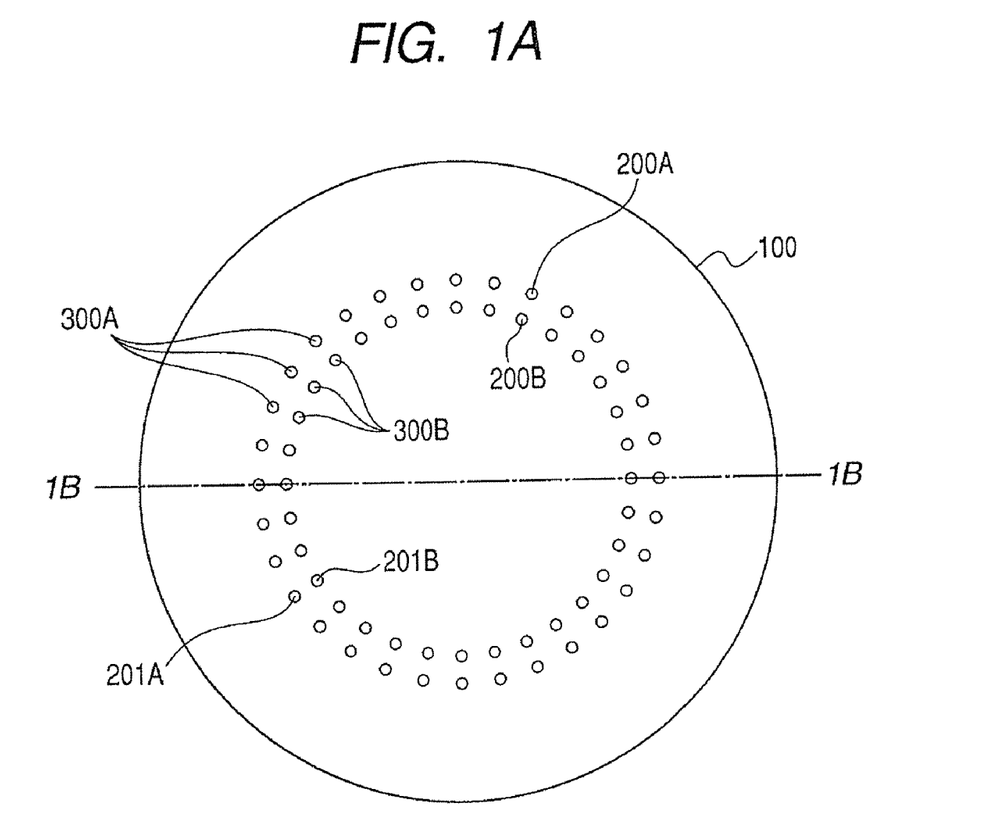
FIG. 1A is a schematic diagram of a mixing apparatus according to one embodiment of the present invention viewed from a nozzle opening.
Figure 1B:
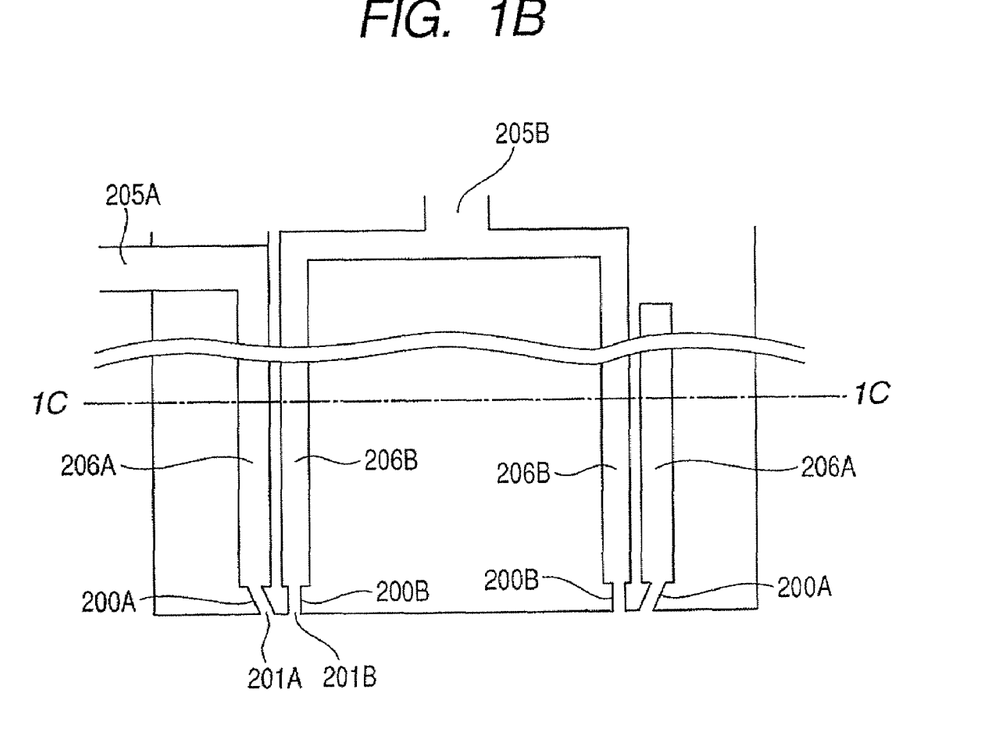
FIG. 1B is a schematic diagram illustrating a cross section taken along the line 1B-1B of FIG. 1A.
Figure 1C:
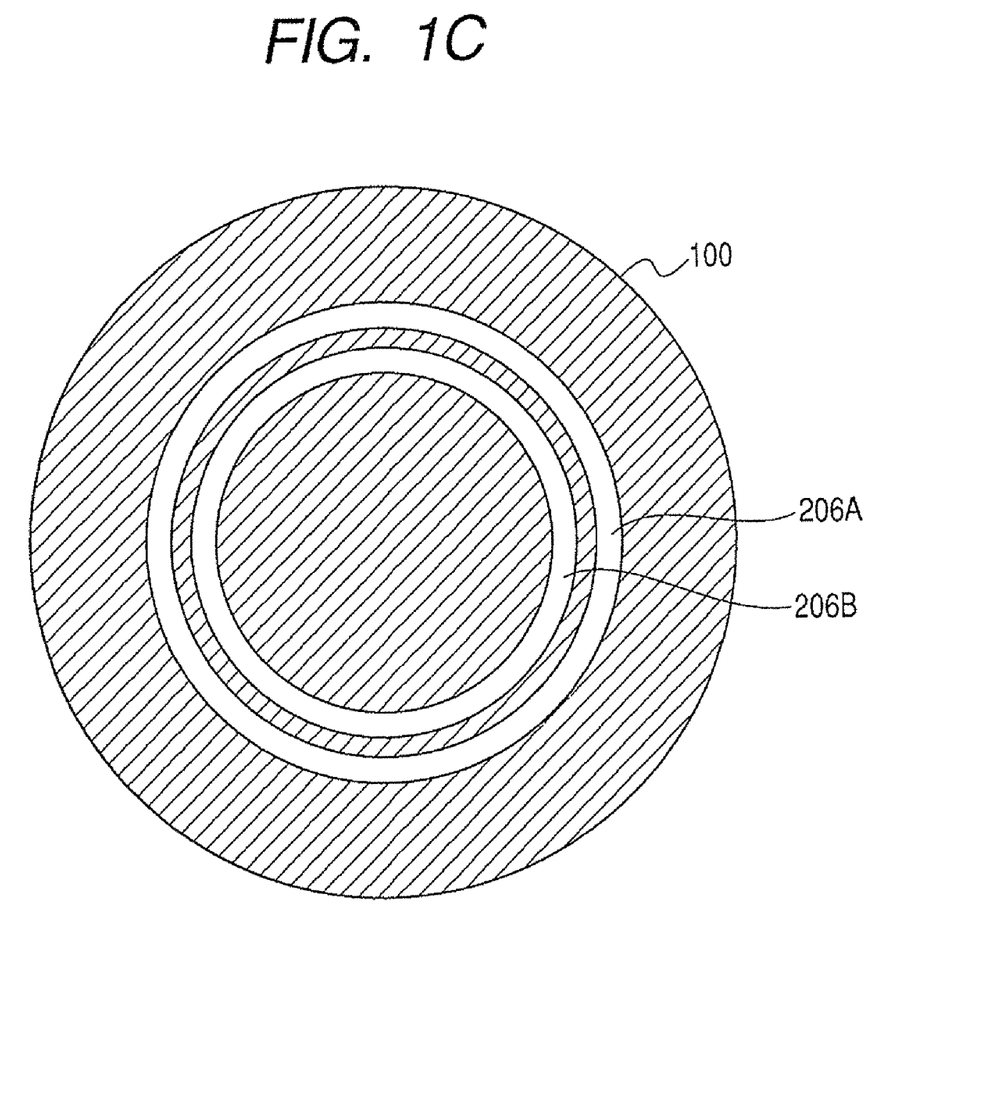
FIG. 1C is a schematic diagram illustrating a cross section taken along the line 1C-1C of FIG. 1B.

FIGS. 1A to 1C are schematic diagrams illustrating one embodiment of a mixing apparatus according to the present invention.

FIG. 1A is a schematic diagram of a mixing apparatus according to one embodiment of the present invention viewed from a nozzle opening. FIG. 1B is a schematic diagram illustrating a cross section taken along the line 1B-1B of FIG. 1A. FIG. 1C is a schematic diagram illustrating a cross section taken along the line 1C-1C of FIG. 1B.

In a mixing apparatus 100 of the present invention, nozzles 200A ejecting the same fluid are arranged in group to form a nozzle group 300A. Nozzles 200B ejecting another same fluid are arranged in group to form a nozzle group 300B. The fluid mixing apparatus causes nozzle openings 201A and 201B forming the nozzle groups 300A and 300B respectively to separately eject different kinds of fluids to start mixing them in areas on the extending lines of the nozzles.

The nozzle openings 201A and 201B in the nozzle groups 300A and 300B of the mixing apparatus 100 of the present invention are arranged along annular loci and the nozzle groups 300A and 300B are arranged coaxially to each other. Wherein, the term "coaxially" used herein refers not only to "completely coaxially" but to "substantially coaxially." A supplying channel 206A is connected to nozzles 200A of the nozzle group 300A. Fluid supplied from a fluid inlet 205A is supplied to the nozzle 200A through the supplying channel 206A. A supplying channel 206B is connected to nozzles 200B of the nozzle group 300B. Fluid supplied from a fluid inlet 205B is supplied to the nozzle 200B through the supplying channel 206B.

The supplying channels 206A and 206B are annular in cross section in the direction perpendicular to the direction in which fluid supplied to the supplying channel flows and the supplying channels 206A and 206B provided corresponding to the nozzle groups 300A and 300B are arranged coaxially to each other. The term "coaxially" used herein also includes "substantially coaxially" in its meaning.

The mixing apparatus 100 described above includes the nozzle groups 300A and 300B each ejecting the same fluid, the supplying channels 206A and 206B for supplying the fluids to the nozzle groups 300A and 300B respectively and fluid inlets 205A and 205B for supplying the fluids to the supplying channels 206A and 206B.

The nozzle group 300A refers to an aggregation of the nozzles 200A ejecting the same fluid. The nozzle openings 201A and 201B in the nozzle groups 300A and 300B each ejecting the same fluid are provided along annular loci and arranged coaxially to each other. In other words, the nozzle openings 201A and 201B each ejecting the same fluid are provided along annular loci and characterized by having no end positionally. For example, arranging nozzles ejecting the same fluid along a linear locus produces a positional starting and end terminal.

Fluid is supplied from the supplying channels 206A and 206B to the nozzle groups 300A and 300B respectively. The supplying channels 206A and 206B are annular in cross section in the direction perpendicular to the direction in which fluid supplied to the supplying channel flows and the supplying channels supplying fluid to the nozzle groups ejecting the fluid are arranged coaxially to each other.

In the mixing apparatus of the present invention, multiple nozzles forming the nozzle group 300A are connected to one supplying channel 206A so that the same fluid is collectively supplied to the nozzle group 300A ejecting the same fluid through the tubular supplying channel 206A.

Figure 2A:
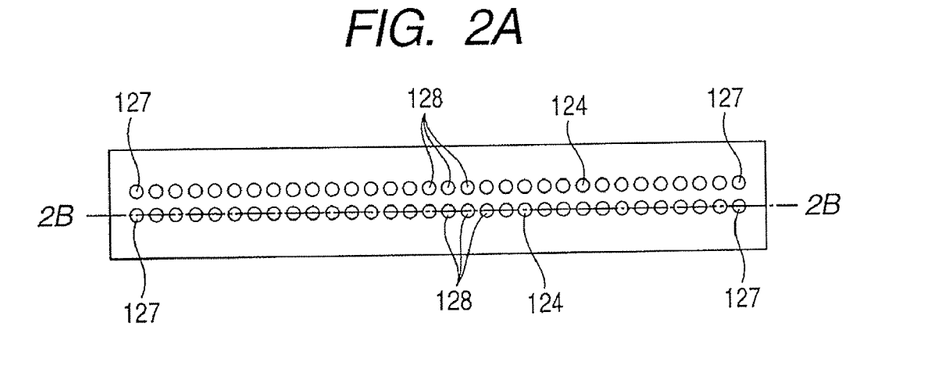
FIGS. 2A, 2B and 2C are schematic diagrams illustrating a mixing apparatus in which nozzle groups formed of linearly arranged nozzles are connected to supplying channels.
Figure 2B:
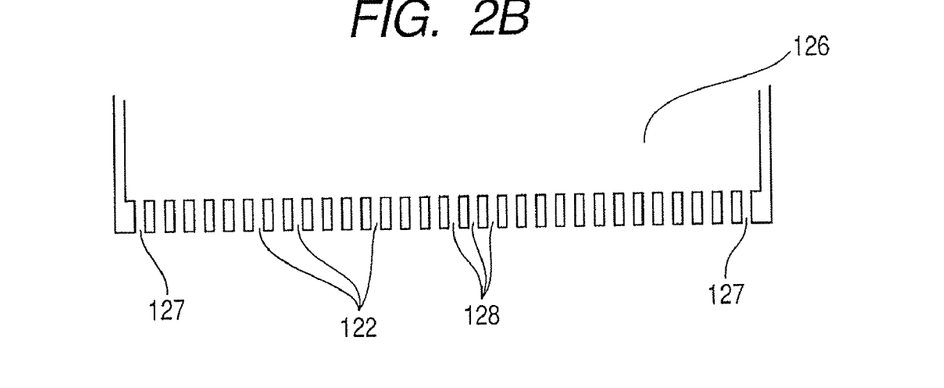
Figure 2C:
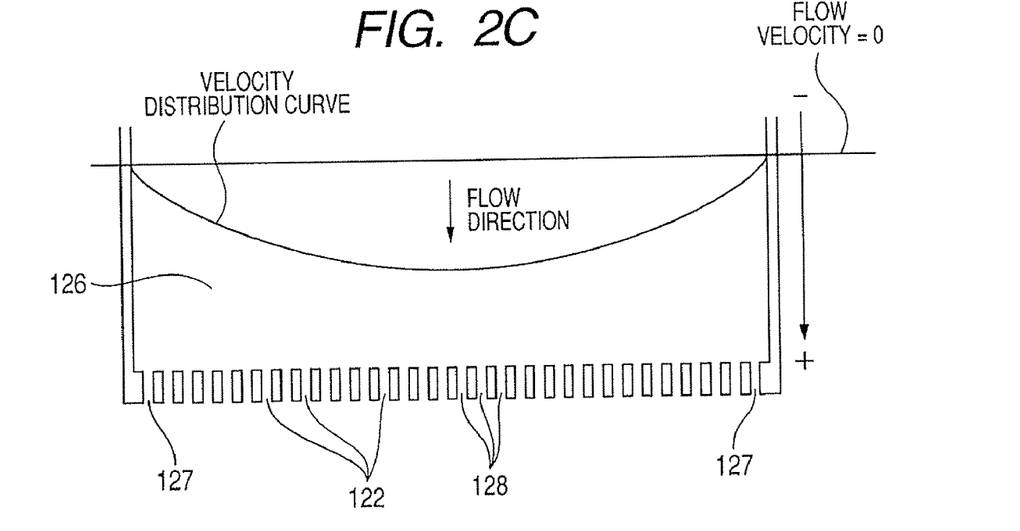

The following states a mixing apparatus in which a nozzle group formed of nozzles linearly arranged is connected to a supplying channel, and its difference from the present invention is described. FIGS. 2A, 2B and 2C are schematic diagrams illustrating a mixing apparatus in which a nozzle group formed of linearly arranged nozzles is connected to a supplying channel. FIG. 2A is a schematic diagram illustrating an arrangement where ends are produced on a locus of the nozzle openings. FIG. 2B is a schematic cross section taken along the line 2B-2B of FIG. 2A. FIG. 2C is a diagram schematically illustrating a velocity distribution at ends and a center portion.

As illustrated in FIGS. 2A and 2B, the linear arrangement of nozzles produces ends 127 at nozzle openings 124. That is to say, the linear arrangement of locus of the nozzle openings 124 and the collective supply of fluid from the supplying channel 126 to the nozzles 122 produce dispersion in ejection conditions for fluid at the ends 127 and a center portion 128.

This is because a velocity distribution gradient illustrated in FIG. 2C is produced at the ends 127 and the center portion 128 in the supplying channel 126. For this reason, linearly arranging a plurality of nozzle openings and performing mixing and chemical reaction in order to increase production quantity cause mixing condition and reaction condition to be different at the ends 127 and the center portion 128 to cause dispersion in products. Providing a fluid inlet and the supplying channel 126 for each of the nozzle openings 124 can reduce dispersion in ejecting conditions, however, a supplying channel in itself needs to be thin tubular, which increases loss in pressure, functionally restricting a fluid delivery unit such as a pump for delivering the fluid. Increasing each supplying channel in itself in size to decrease pressure loss needs increasing space intervals between adjacent nozzles 122, leading to increasing space taken up by the mixing apparatus.

The mixing apparatus of the present invention has no ends illustrated in FIG. 2A. Even if fluid is collectively supplied from the supplying channel to the nozzle groups, dispersion in the ejecting conditions in each nozzle can be made small because the supplying channels are annular. This allows unifying mixing and reacting conditions even if a plurality of nozzle openings is arranged to increase production quantity and mixing and chemical reaction are performed, thereby permitting unifying physical property and shapes of products.

Figure 3A:
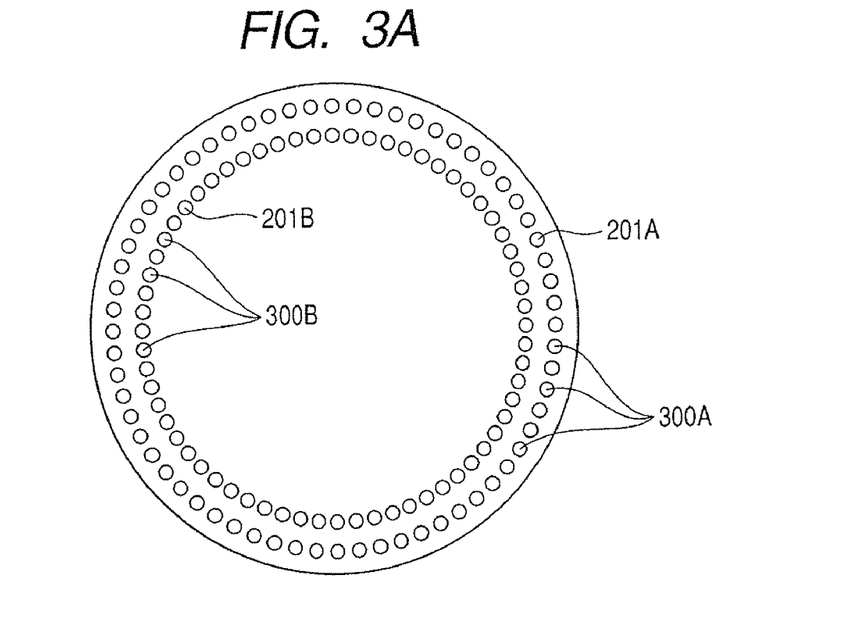
FIG. 3A is a diagram illustrating one example of embodiments of the mixing apparatus adapted to mass production according to the present invention.

In the present invention, at the time of mass production, the space intervals may be reduced between the nozzle openings 201A and between the nozzle openings 201B ejecting the same fluid as illustrated in FIG. 3A.

Figure 3B:
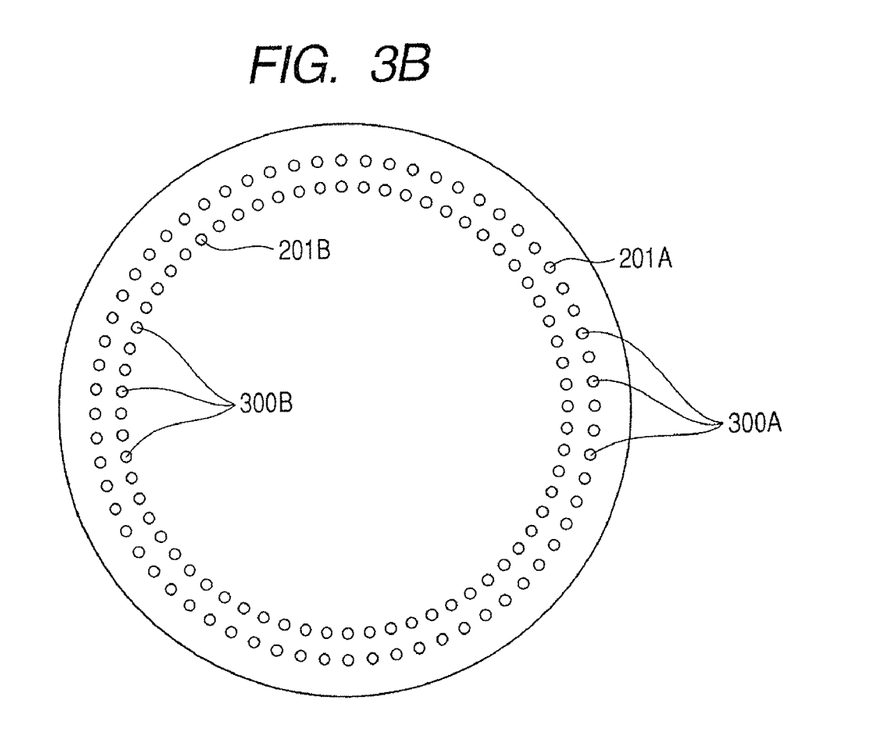
FIG. 3B is a diagram illustrating another example of embodiments of the mixing apparatus adapted to mass production according to the present invention.

In addition, increasing an annular diameter with the space intervals between the nozzle openings 201A and between the nozzle openings 201B ejecting fluid mixed with each other maintained to increase the absolute amount of the nozzle openings 201A and 201B ejecting the same fluid enables rapid response as illustrated in FIG. 3B.

In the present invention, fluid can be collectively delivered from the supplying channels 206A and 206B to the nozzles 200A and 200B of the nozzle groups 300A and 300B, therefore, supplying channels do not need to be provided for each of the nozzles. This permits reduction in the number of the fluid inlets 205A and 205B, enabling the simplification of structure of the mixer in itself.

The nozzle openings 201 in the nozzle groups 300 ejecting the same fluid in the present invention are provided along the annular locus. The term "annular locus" used herein refers to a circular or an elliptic locus as is not the case where ends are produced as illustrated in FIGS. 2A, 2B and 2C. The locus of the nozzle opening 201 in the nozzle group 300 ejecting the same fluid may be annular, desirably circular, more desirably completely circular. The nozzle openings 201 ejecting fluid mixed with each other are desirably arranged coaxially to each other. The nozzles 200 in which fluid is mixed with each other are desirably equal to each other in space interval. If the nozzles 200 in which fluid is mixed with each other are different in space interval, mixing and reaction conditions are also different according the difference to produce dispersion in the products. If dispersion in the products is within an allowance, the space interval does not always need to be equalized.

The nozzle opening 201 does not always need to be circular, but may be square, hexagonal or elliptical.

The area of one nozzle opening 201 generally ranges from 0.0007 $mm^2$ or more to 0.08 $mm^2$ or less. The area is desirably 0.008 $mm^2$ or less, or more desirably 0.001 $mm^2$ or less. If the nozzle opening 201 is circular or elliptical, a narrow side (diameter) generally ranges from 30 μm or more to 3000 μm or less. It is desirably 1000 μm or less, more desirably 500 μm or less, or still more desirably 100 μm or less. Decreasing the diameter of the nozzle opening 201 reduces the absolute amount of fluid to increase mixing efficiency, but increasing loss in pressure when fluid higher in viscosity is treated. For this reason, the diameter of the nozzle opening is properly set according to fluid used.

The nozzle openings ejecting the same fluid are desirably equal in diameter to each other. Difference in opening diameter causes variation in ejecting conditions of the nozzles, but if variation in obtained products is within an allowance, the opening diameter does not need to be equalized.

The shape of the nozzle opening 201 ejecting fluid mixed with each other is set for each fluid to be ejected. For this reason, the nozzle opening 201 does not need to be the same in shape.

The nozzle opening 201 ejecting the same fluid does not need to be arranged at the same pitch, but may be properly set.

The shape of the nozzle 200 can be set according to the shape of fluid to be ejected. One example of "the shape of fluid" used herein includes "thin-rod shaped" or "misty." The shape of fluid can be controlled not only by the shape of the nozzle 200, but density, pressure and flow rate of fluid. Ejecting thin-rod shaped fluid to collide with each other enables increasing inertia force acting on the fluids. Ejecting spray-like fluid enables increasing surface area where the fluids contact with each other. Ejection may be performed with one of the fluids in thin-rod shaped and the other in spray-like. Incidentally, the shape of the nozzle opening refers to a shape viewed from the nozzle opening surface as illustrated in FIG. 1A. The shape of the nozzle refers to part where fluid passes, provided between the supplying channel and the nozzle opening. Both are different in meaning.

The length of the nozzle 200 generally ranges from 0.5 mm or more to 10 mm or less. The length is desirably 5 mm or less, or more desirably 3 mm or less.

A material used in the mixing apparatus of the present invention is selected from among those preferable in terms of heat resistance, pressure resistance and solvent resistance to the fluid used. For example, the material includes metal, glass, silicon, Teflon (registered trademark) and ceramics, and metal is desirable. Example of the metal includes stainless steel, Hastelloy (Ni—Fe based alloy) nickel, gold, platinum and tantalum. The metallic materials used in the present invention are not limited to those. In addition, a material may be used, of which channel surface subjected to lining process to obtain corrosion resistance of wetted part and desired surface energy.

The mixing apparatus of the present invention may be formed of the above single material, or does not need to be formed of the above single material, or may be produced using suitable materials for each portion to assemble and connect the materials.

According to the mixing apparatus of the present invention, a reaction is conduced in which a solid such as a particle is produced by mixing, however, a mixing field is open space, so that clogging and deposition of products in the mixing apparatus are not caused. If the reaction liquids ejected from the nozzles are brought into contact with each other to start reaction to perform reaction producing fine particles, reaction momentarily advances to produce a large number of nucleus based on which a large number of particles grow to form fine particle small in primary particle diameter. This permits obtaining fine particles of functional substance small in primary particle diameter. The reaction liquid is brought into contact with each other always at the same timing to provide order for reaction, so that particle size distribution can be narrowly suppressed. Mixing may or may not involve a chemical reaction.

A dispersion manufacturing apparatus of the present invention is described below.

The dispersion manufacturing apparatus of the present invention includes a plurality of nozzle groups each formed of nozzles for ejecting the same fluid arranged in group, the nozzles being provided with openings for ejecting fluid.

A plurality of fluids is separately ejected from the plurality of nozzle groups to react with each other in areas on the extending lines of the nozzles to produce reaction products, thereby dispersing the reaction products in a dispersion medium. The dispersion manufacturing apparatus of the present invention applies the mixing apparatus of the present invention to the manufacture of dispersion.

In the dispersion manufacturing apparatus of the present invention, one of a plurality of fluids may contain solution of a colorant and the other may contain a dispersion medium of the colorant. Furthermore, one of a plurality of fluids may contain solution of pigment and dispersant and the other may contain a medium lowering solubility of the pigment. Still furthermore, one of a plurality of fluids may contain solution of a coupler and the other may contain solution containing diazonium salt.

A colorant can be taken as one example of materials produced using the mixing apparatus of the present invention. The colorant includes dye and pigment. The pigment may include inorganic achromatic color pigment or organic or inorganic chromatic color pigment, or may include achromatic or hypochromic pigment or metallic luster pigment. A pigment newly synthesized pigment to be prepared for the present invention may be used.

The present invention includes a dispersion manufacturing method. The dispersion manufacturing method of the present invention includes a process for reacting at least two different kinds of fluids to produce reaction products and causes particles composed of the reaction products to disperse in a dispersion medium. In the dispersion manufacturing method of the present invention, the mixing apparatus of the present invention is prepared and then applied to the dispersion manufacturing apparatus. At this point, the dispersion manufacturing method includes a process in which at least two different kinds of fluids supplied from a plurality of supplying channels are ejected from a plurality of nozzle groups.

The kind of a pigment used in the present invention is not particularly limited, but known pigments may be used. For example, known pigments include phthalocyanine based pigment such as metal-free phthalocyanine, copper phthalocyanine, halogenated copper phthalocyanine and titanyl phthalocyanine; azo based pigment such as insoluble azo pigment, condensed azo pigment, azo lake, chelate azo pigment; quinacridon based pigment; iso-indolinone based pigment; indanthrone based pigment; diketo pyrrolopyrrole based pigment; dioxazine based pigment; perylene based pigment; perynone based pigment; and anthraquinone based pigment, however, pigments usable are not limited to the above.

Reactions used in manufacture of the above colorant include reprecipitation reaction, coupling reaction and hydrolysis polycondensation reaction, however, reactions are not limited to the above, but known reactions may be used.

For example, in reprecipitation reaction, a combination can be taken as one example in which one of the fluids is solution of pigment and the other is a precipitant medium of a pigment (a medium for lowering solution of pigment). At this point, a reaction product is a pigment, a dispersant is contained in any one of the fluids or both of the fluids to obtain the dispersant as a dispersion of a pigment. If the products have a desired dispersion to a precipitant medium, the dispersant does not always need to be contained in any one of fluids or both of the fluids.

In coupling reaction, a combination can be taken as one example in which one of the fluids is solution of a coupler and the other is diazonium salt solution, for example. At this point, a reaction product is azo compound, a dispersant is contained in any one of the fluids or both of the fluids to obtain the dispersant as a dispersion of azo compound. If the azo compound of the reaction product has a desired dispersion to a dispersion medium, the dispersant does not always need to be contained in any one of fluids or both of the fluids.

In hydrolysis polycondensation reaction, a combination can be taken as one example in which one of the fluids is inorganic alkoxide and the other is solution containing water, for example. At this point, a reaction product is inorganic alkoxide hydrolysis polycondensate.

EMBODIMENTS

The present invention is described in detail below with reference to embodiments. The present invention, however, is not limited to the embodiments.

First Embodiment

A mixing apparatus of the present embodiment is described with reference to FIGS. 1A, 1B and 1C.

A mixing apparatus 100 includes nozzles 200A and 200B, nozzle groups 300A and 300B, supplying channels 206A and 206B and fluid inlet 205A and 205B formed by a stainless steel member. Fluid ejected from the nozzle groups is introduced from their respective fluid inlets and supplied through the supplying channels. That is to say, fluid 1 is introduced from the fluid inlet 205B, passes through supplying channel 206B and ejected from the nozzle group 300B. Fluid 2 is introduced from the fluid inlet 205A, passes through supplying channel 206A and ejected from the nozzle group 300A. The fluids 1 and 2 ejected in a thin-rod shape from the nozzle groups 300B and 300A are brought into contact in areas on the extending lines of the nozzles to start mixing. Chemical reaction may or may not be involved between two different kinds of the fluids introduced in mixing.

As illustrated in FIGS. 1B and 1C, the supplying channels 206A and 206B are annular in cross section in the direction perpendicular to the direction in which supplied fluid flows. The supplying channels supplying fluid to the nozzle groups each ejecting the fluid are arranged coaxially to each other. The annular supplying channel 206B supplying the fluid 1 is 85 mm in inside diameter and has a width of 10 μm toward the outside. The annular supplying channel 206A supplying the fluid 2 is 102 mm in inside diameter and has a width of 10 μm toward the outside.

The fluid inlet 205B introducing the fluid 1 is connected to the supplying channel 206B and the fluid inlet 205A introducing the fluid 2 is connected to the supplying channel 206A.

As illustrated in FIG. 1A, the nozzle openings in the nozzle groups 300A and 300B each ejecting the same fluid are provided along annular loci and arranged coaxially to each other.

The nozzle group 300B is formed such that the nozzle opening 201B ejecting the fluid 1 is circular and 300 μm in diameter and draws an annular locus of 9 mm in diameter. The nozzles 200B forming the nozzle group 300B are 32 in number and arranged at an angle of 11.25 degrees at the same pitch.

The nozzle group 300A is formed such that the nozzle opening 201A ejecting the fluid 2 is circular and 300 μm in diameter and draws an annular locus of 10.4 mm in diameter. The nozzles 200A forming the nozzle group 300A are 32 in number and arranged at an angle of 11.25 degrees at the same pitch.

The centers of the annular loci of the nozzle openings 201A and 201B forming the nozzle groups 300A and 300B respectively coincide with each other. The nozzle opening 201A of the nozzle group 300A is arranged on the extending straight-line connected between the center and the nozzle opening 201B of the nozzle group 300B. The fluids 1 and 2 ejected separately from the nozzles 200B and 200A respectively which have a straight-line positional relationship with each other are brought into contact with each other in the areas on the extending lines of the nozzle 200B and 200A and start mixing.

Since the supplying channels of the mixing apparatus 100 of the present invention are annular, even if fluid is collectively fed into the nozzle groups from the supplying channels, variation in ejecting conditions at the nozzles 200A and 200B can be reduced. This allows unifying mixing and reacting conditions even if a plurality of nozzle openings is arranged to increase production quantity and mixing and chemical reaction are performed using the mixing apparatus 100 of the present invention, so that physical property and shapes of products can be unified. In addition, a reaction is conduced in which a solid such as a particle is produced by mixing, however, a mixing field is open space, so that clogging and deposition of products in the mixing apparatus are not caused. If the reaction liquids ejected from the nozzles are brought into contact with each other to start reaction to perform reaction producing fine particles, reaction momentarily advances to produce a large number of nucleus based on which a large number of particles grow to form fine particle small in primary particle diameter. This permits obtaining fine particles of functional substance small in primary particle diameter. The reaction liquid is brought into contact with each other always at the same timing to provide order for reaction, so that particle size distribution can be narrowly suppressed.

Second Embodiment

In the present embodiment, the mixing apparatus of the first embodiment is used to produce a dispersion of magenta pigment by reprecipitation reaction.

A hundred parts of dimethyl sulfoxide were added to 10 parts of quinacridon pigment of C.I. Pigment Red 122 as fluid 1 to perform suspension. Subsequently, 40 parts of sodium lauryl sulfate as a dispersant were added and 25% potassium hydroxide aqueous solution was added to such an extent that these dissolve to prepare the fluid 1. Ion-exchange water was used as the fluid 2. The fluid 1 was introduced from the fluid inlet 205B and passed through the supplying channel 206B and ejected from the nozzle group 300B. The fluid 2 was introduced from the fluid inlet 205A and passed through the supplying channel 206A and ejected from the nozzle group 300A. A syringe pump was used as a fluid supplying unit to supply the fluids 1 and 2 to the their respective nozzles.

The flow rate of the nozzle 200B ejecting the fluid 1 from the syringe pump is 7 ml/min per nozzle. The flow rate of the nozzle 200A ejecting the fluid 2 from the syringe pump is 7 ml/min per nozzle.

The fluids 1 and 2 were brought into contact with each other on the extending lines in the direction in which the fluids advance to momentarily cause reprecipitation reaction and dispersion to produce the dispersion of a quinacridon pigment. The dispersion was exactly uniformed in particle diameter and an average particle diameter was 30 nm.

Third Embodiment

A mixing apparatus of the present embodiment is described with reference to FIGS. 4A and 4B.

Figure 4A:
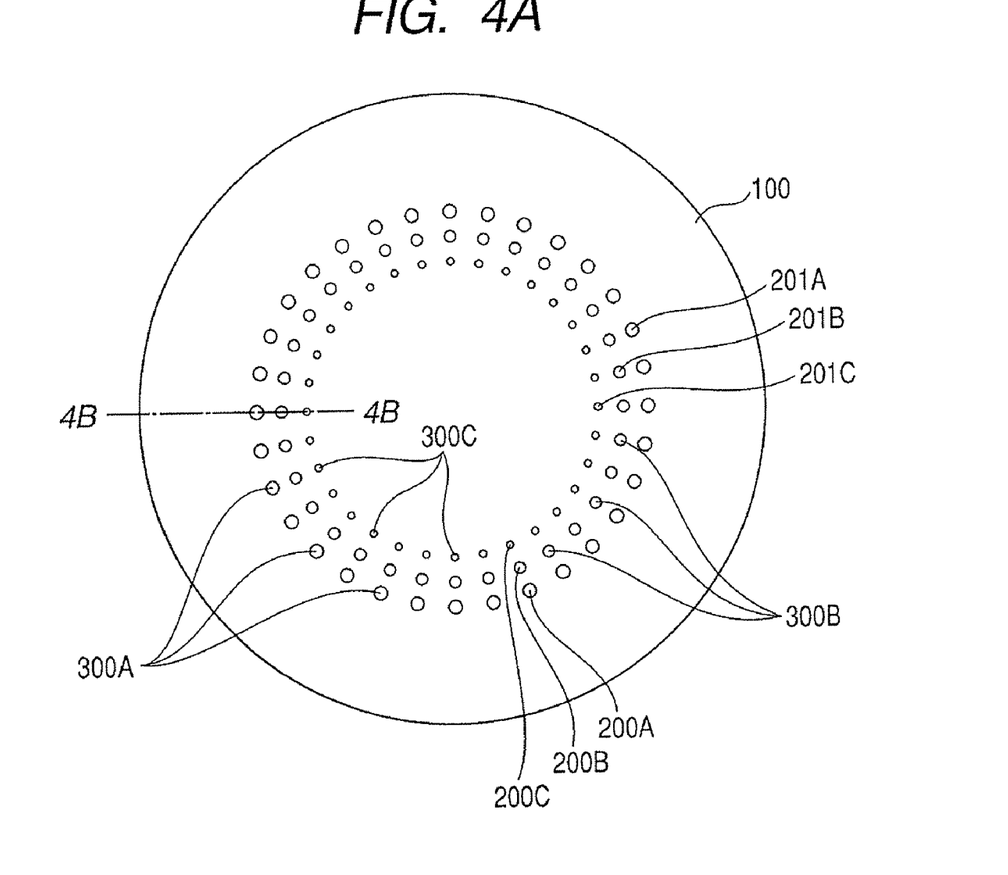
FIGS. 4A and 4B are schematic diagrams illustrating a mixing apparatus of a third embodiment of the present invention viewed from a nozzle opening.
Figure 4B:
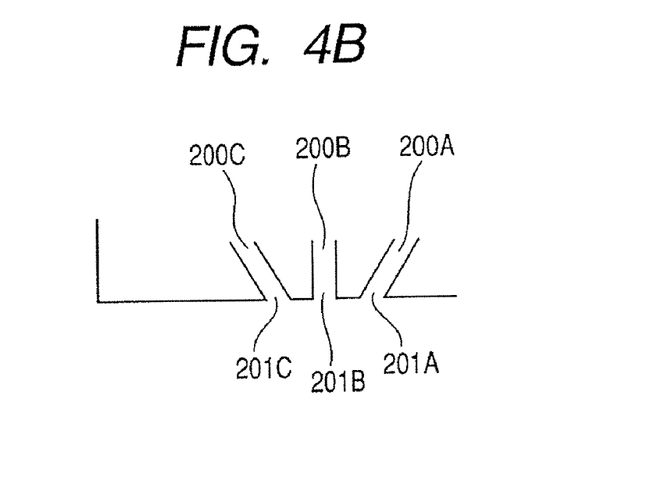

FIGS. 4A and 4B illustrate a mixing apparatus of the third embodiment according to the present invention. FIG. 4A is a schematic diagram viewed from a nozzle opening surface and FIG. 4B is a schematic diagram in cross section taken along the line 4B-4B of FIG. 4A. A mixing apparatus 100 of the present embodiment is provided with three different kinds of nozzle groups 300A, 300B and 300C and capable of mixing together three different kinds of fluids. As is the case with the first embodiment, the nozzle groups 300A, 300B and 300C are provided for each kind of fluids. Supplying channels (not shown) and fluid inlets (not shown) are provided for each nozzle group ejecting their respective fluids. As is the case with the first embodiment, the nozzle openings 201A, 201B and 201C forming the nozzle groups 300A, 300B and 300C respectively are provided along the annular loci and arranged coaxially to each other. The difference from the first embodiment is that the nozzle group 300C capable of ejecting another different kind of fluid is provided at an innermost periphery as illustrated in FIG. 4A.

The centers of the annular loci of the nozzle openings 201A, 201B and 201C forming three different kinds of the nozzle groups 300A, 300B and 300C ejecting their respective fluids coincide with each other. The nozzle openings 201A, 201B and 201C of the nozzle groups 300A, 300B and 300C are arranged on the extending straight-lines connected between the center and the nozzle openings of the nozzle group arranged at an innermost periphery. The fluids are separately ejected from the nozzles having a straight-line positional relationship with each other, brought into contact with each other and start mixing in areas on the extending lines of nozzles 200A, 200B and 200C. As is not the case with the first embodiment, the nozzle group 300B is formed such that the nozzle opening 201C of the nozzle group 300C provided at an innermost periphery is circular and 150 μm in diameter and draws an annular locus of 7.6 mm in diameter.

The mixing apparatus of the present embodiment is capable of mix together three different kinds of fluids, however, the mixing apparatus may be used to mix together two different kinds of fluids without introducing fluid into one nozzle group. In addition, two out of three different kinds nozzle groups may be used to eject the same fluid. The mixing apparatus is especially suitable for the case where three different kinds of compounds are used for reaction.

Fourth Embodiment

In the present embodiment, the mixing apparatus of the third embodiment is used to produce dispersion of lipophilic yellow dye by mixing.

Solution was prepared in which 7 parts by weight of lipophilic dye Oil Yellow (produced by Orient Chemical Industries, LTD) was dissolved into 25 parts by weight of tetrahydrofuran as the fluid 1 to be ejected from the nozzle group 300A at the outermost periphery. The fluid 1 was ejected by the nozzle 200A in the nozzle group 300A at the outermost periphery at a flow rate of 6 ml/min per nozzle.

A 0.1 mol/l potassium hydroxide aqueous solution was used as the fluid 3 to be ejected from the nozzle group 300C at the innermost periphery. The fluid 3 was ejected by the nozzle 200C in the nozzle group 300C at the innermost periphery at a flow rate of 14 ml/min per nozzle.

Block copolymer being a dispersant was used as fluid to be ejected from the other nozzle group 300B. That is to say, deprotected ethyl benzoate of block C of triblock copolymer being copolymer with a copolymerization mole ratio of A/B/C=90/80/14 was used, with 2-(4-methylphenyl)ethyl vinyl ether as a segment A, 2-(2-methoxyethyloxy) ethyl vinyl ether as a segment B and 4-(2-vinyloxy) ethoxy ethyl benzoate as a segment C.

Solution was prepared in which 10 parts by weight of triblock copolymer was dissolved into 25 parts by weight of tetrahydrofuran as the fluid 2 and ejected by the nozzle 200B in the other nozzle group 300B at a flow rate of 7 ml/min per nozzle.

The fluids 1, 2 and 3 were brought into contact on the extending lines in the direction in which the fluids advance, benzoic acid of the block C was neutralized by potassium hydroxide, inclusion of lipophilic dye Oil Yellow in triblock copolymer momentarily advances, and a large number of micelles were produced to form small and uniform micelles. Average particle diameter was 60 nm.

Fifth Embodiment

A mixing apparatus of the present embodiment is described with reference to FIGS. 5A and 5B.

Figure 5A:
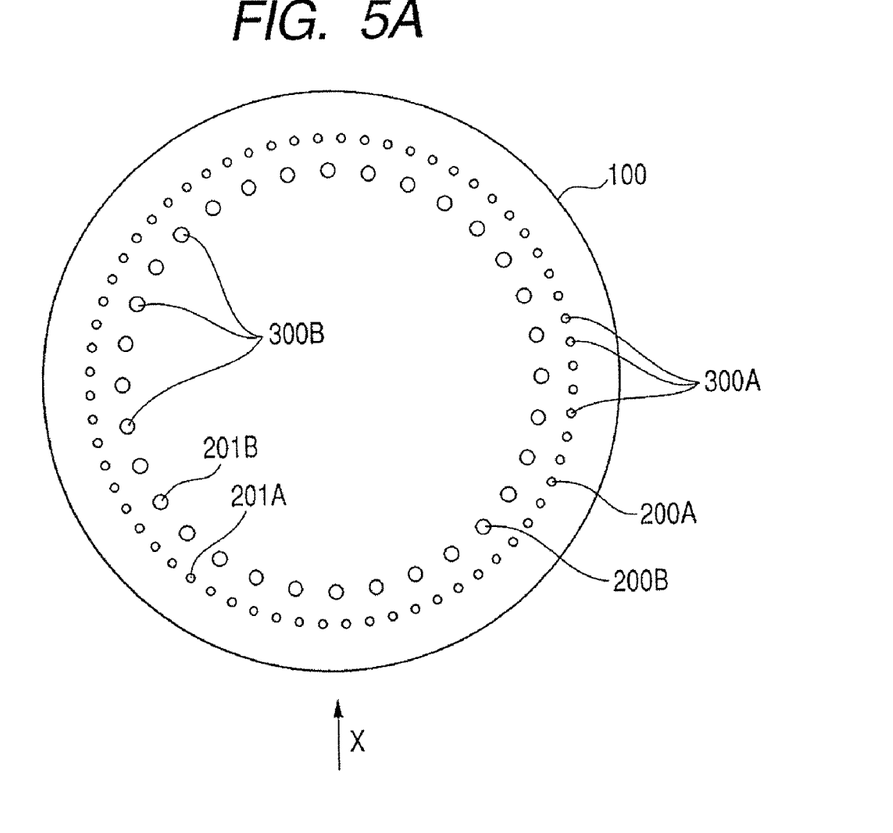
FIGS. 5A and 5B are schematic diagrams illustrating a mixing apparatus of a fifth embodiment of the present invention viewed from a nozzle opening.
Figure 5B:
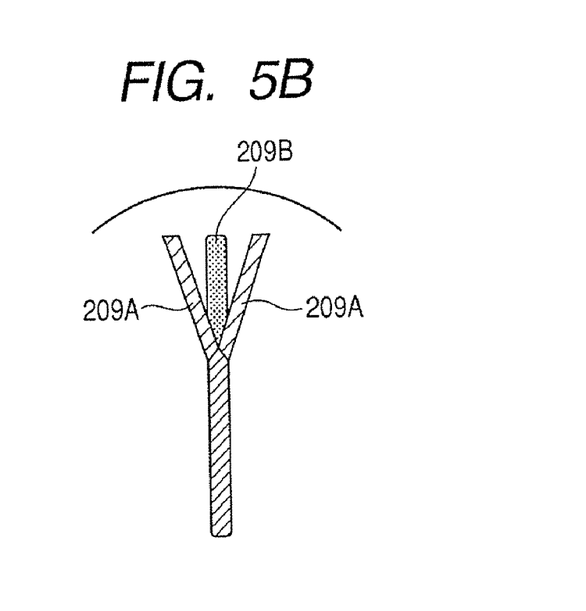

FIGS. 5A and 5B illustrate one example of the mixing apparatus of the fifth embodiment according to the present invention. FIG. 5A is a schematic diagram viewed from a nozzle opening 201. FIG. 5B is a schematic diagram illustrating an appearance that fluids are ejected and mixed, viewed from an arrow X in FIG. 5A.

A mixing apparatus 100 of the present embodiment is provided with two different kinds of nozzle groups 300A and 300B and capable of mix together two different kinds of fluids.

The nozzle group 300B is formed such that the nozzle opening 201B ejecting the fluid 1 is circular and 300 μm in diameter and draws an annular locus of 9 mm in diameter. The nozzles 200B forming the nozzle group 300B are 32 in number and arranged at an angle of 11.25 degrees at the same pitch.

The nozzle group 300A is formed such that the nozzle opening 201A ejecting the fluid 2 is circular and 212 μm in diameter and draws an annular locus of 10.4 mm in diameter. The nozzles 200A forming the nozzle group 300A are 64 in number.

The centers of the annular loci of the nozzle openings 201A and 201B forming the nozzle groups 300A and 300B substantially coincide with each other.

The nozzle opening 201A of the nozzle group 300A does not exist on the extending straight-line connected between the center and the nozzle opening 201B of the nozzle group 300B. The nozzle opening 201A of the nozzle group 300A intervenes between the extending straight lines and is arranged at a substantially equal distance from the extending lines.

In the mixing apparatus of the present invention, as illustrated in FIG. 5B, fluids 209A ejected from two nozzles 200A are brought into contact with fluid 209B ejected from one nozzle 200B in areas on the extending lines of the nozzles to start mixing. In the mixing apparatus of the present embodiment, ejecting fluid high in viscosity from the nozzle group 300A enables ejecting the fluid 2 with the same amount as in the first embodiment as a thinner rod-shaped fluid than that in the mixing apparatus 100 of the first embodiment. Accordingly, a mixing efficiency will be increased.

Sixth Embodiment

In the present embodiment, the mixing apparatus of the fifth embodiment is used to produce a dispersion of azo pigment by coupling reaction.

A 3,3'-dichlorobenzidene tetra-azo aqueous solution was used as fluid 1 and solution in which polyoxyethylene lauryl ether is dissolved into coupler aqueous solution with a concentration of about 5% was used as fluid 2. The fluid 1 was introduced from a fluid inlet (not shown), passes through a supplying channel (not shown) and ejected from the nozzle group 300B. The fluid 2 was introduced from a fluid inlet (not shown), passes through a supplying channel (not shown) and ejected from the nozzle group 300A. A syringe pump was used as a fluid supplying unit to supply the fluids 1 and 2 to their respective nozzles. The flow rate of the nozzle 200B ejecting the fluid 1 is 7 ml/min per nozzle. The flow rate of the nozzle 200A ejecting the fluid 2 is 3.5 ml/min per nozzle. In the present embodiment, the fluids 2 ejected from two nozzles are brought into contact with the fluid 1 ejected from one nozzle 200B on the extending lines in the directions in which the fluids advance to momentarily cause synthesis reaction and dispersion to provide a dispersion of C.I. Pigment Yellow 83. The dispersion was exactly uniformed in particle diameter and an average particle diameter was 30 nm.

According to the mixing apparatus of the present invention, variation in ejection can be reduced between the nozzles ejecting the same fluid, so that mixing and chemical reaction of the fluid can be efficiently performed with a small variation. For this reason, the mixing apparatus of the present invention can be used as an apparatus for manufacturing a colorant dispersion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-278111, filed Oct. 11, 2006 which is hereby incorporated by reference herein in its entirety.

What is claimed is:

1. A mixing apparatus comprising a plurality of nozzle groups each formed of nozzles for ejecting the same fluid arranged in group, the nozzles being provided with openings for ejecting fluid, to cause the plurality of nozzle groups to separately eject a plurality of fluids to mix the fluids in areas on the extending lines of the nozzles, wherein the openings of the nozzles forming the nozzle groups are arranged along annular loci and the plurality of nozzle groups are arranged coaxially to each other, a plurality of supplying channels for supplying the plurality of fluids to the nozzle groups corresponding to the plurality of nozzle groups are annular in cross section in the direction perpendicular to the direction in which fluid supplied to the supplying channels flows and arranged coaxially to each other.

2. The mixing apparatus according to claim 1, wherein the fluid ejected from the nozzle is thin rod shaped.

3. The mixing apparatus according to claim 1, wherein the fluid ejected from the nozzles is misty.

4. The mixing apparatus according to claim 1, wherein the area of the nozzle opening ranges from 0.0007 mm² or more to 0.08 mm² or less.

5. The mixing apparatus according to claim 1, wherein the diameter of the opening ranges from 30 μm or more to 3000 μm or less.

6. The mixing apparatus according to claim 1, wherein the length of the nozzle ranges from 0.5 mm or more to 10 mm or less.

7. A dispersion manufacturing apparatus comprising a plurality of nozzle groups each formed of nozzles for ejecting the same fluid arranged in group, the nozzles being provided with openings for ejecting fluid, to cause the plurality of nozzle groups to separately eject a plurality of fluids to react the fluids in areas on the extending lines of the nozzles to produce reaction products to disperse the reaction products in a dispersion medium, wherein the openings of the nozzles forming the nozzle groups are arranged along annular loci and the plurality of nozzle groups are arranged coaxially to each other, a plurality of supplying channels for supplying the plurality of fluids to the nozzle groups corresponding to the plurality of nozzle groups are annular in cross section in the direction perpendicular to the direction in which fluid supplied to the supplying channels flows and arranged coaxially to each other.

8. The dispersion manufacturing apparatus according to claim 7, wherein one of the plurality of fluids is solution of a colorant and the other is dispersion medium of a colorant.

9. The dispersion manufacturing apparatus according to claim 7, wherein one of the plurality of fluids is solution containing pigment and dispersant and the other is a medium for lowering solubility of the pigment.

10. The dispersion manufacturing apparatus according to claim 7, wherein one of the plurality of fluids is solution containing a coupler and the other is solution containing diazonium salt.

11. A method of manufacturing dispersion including reacting at least two different kinds of fluids to produce reaction products and dispersing particles formed of the reaction products in dispersion medium, the method comprising: preparing a mixing apparatus comprising a plurality of nozzle groups each formed of nozzles for ejecting the same fluid arranged in group, the nozzles being provided with openings for ejecting fluid, to cause the plurality of nozzle groups to separately eject a plurality of fluids to mix the fluids in areas on the extending lines of the nozzles, wherein the openings of the nozzles forming the nozzle groups are arranged along annular loci and the plurality of nozzle groups are arranged coaxially to each other, a plurality of supplying channels for supplying the plurality of fluids to the nozzle groups corresponding to the plurality of nozzle groups are annular in cross section in the direction perpendicular to the direction in which fluid supplied to the supplying channels flows and arranged coaxially to each other; and ejecting at least two different kinds of fluids supplied from the plurality of supplying channels from the nozzle groups.

* * * * *